(12) United States Patent
Hecht

(10) Patent No.: US 7,004,692 B2
(45) Date of Patent: Feb. 28, 2006

(54) ROTARY CUTTING TOOL

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 306 days.

(21) Appl. No.: 10/454,079

(22) Filed: Jun. 4, 2003

(65) Prior Publication Data
US 2004/0022594 A1 Feb. 5, 2004

(30) Foreign Application Priority Data
Jun. 4, 2002 (IL) ..................................... 150013

(51) Int. Cl.
*B23B 51/00* (2006.01)
(52) U.S. Cl. ................... 408/233; 408/239 R; 279/8; 279/93
(58) Field of Classification Search ............... 408/226, 408/231, 233, 239 A, 239 R; 279/8, 93
See application file for complete search history.

(56) References Cited

U.S. PATENT DOCUMENTS

| 804,602 | A | * | 11/1905 | Howk ........................ 408/233 |
| 817,377 | A | * | 4/1906 | Kootz et al. ................ 408/226 |
| 1,232,980 | A | * | 7/1917 | Rossigno .................... 408/201 |
| 2,289,583 | A | * | 7/1942 | Malone ...................... 403/317 |
| 2,623,422 | A | * | 12/1952 | Billingsley, Jr. ............ 408/171 |
| 2,649,284 | A | * | 8/1953 | Letts .......................... 175/412 |
| 3,730,637 | A | * | 5/1973 | Cellini ................... 408/239 R |
| 4,040,765 | A | | 8/1977 | Vig |
| 4,099,889 | A | * | 7/1978 | Vig ........................ 408/239 R |
| 4,325,664 | A | * | 4/1982 | Mori .......................... 409/234 |
| 4,705,435 | A | * | 11/1987 | Christoffel ................... 408/59 |
| 4,811,843 | A | * | 3/1989 | Stribiak ...................... 206/349 |
| 4,834,594 | A | * | 5/1989 | Morgan .................. 408/239 A |
| 4,836,706 | A | * | 6/1989 | Mitchell ....................... 403/24 |
| 4,934,883 | A | * | 6/1990 | Andersson et al. ......... 409/234 |
| 5,163,790 | A | | 11/1992 | Vig |
| 5,607,263 | A | * | 3/1997 | Nespeta et al. ............... 407/61 |
| 5,899,642 | A | * | 5/1999 | Berglow et al. .............. 407/40 |
| 6,276,879 | B1 | * | 8/2001 | Hecht .......................... 409/234 |
| 6,394,711 | B1 | * | 5/2002 | Brosius ........................ 408/57 |
| 6,494,648 | B1 | * | 12/2002 | Harpaz ......................... 407/30 |
| 6,540,449 | B1 | * | 4/2003 | Bejerstål et al. .............. 407/40 |
| 6,565,291 | B1 | * | 5/2003 | Harpaz et al. ................ 407/53 |
| 6,902,355 | B1 | * | 6/2005 | Kress et al. ................... 408/59 |
| 6,923,605 | B1 | * | 8/2005 | Jakob et al. ................. 409/233 |
| 2002/0021945 | A1 | * | 2/2002 | Harpaz et al. ................ 407/53 |
| 2003/0210963 | A1 | * | 11/2003 | Kakai et al. ................ 408/231 |

* cited by examiner

*Primary Examiner*—Boyer D. Ashley
*Assistant Examiner*—Michael W. Talbot
(74) *Attorney, Agent, or Firm*—Womble Carlyle

(57) ABSTRACT

A rotary cutting tool has a cutting head, a screw member and a tool shank. The cutting head has an axially directed through bore with locking wings protruding from the bore surface. Each locking wing having a sloping locking surface and stopper with a stop surface. The screw member has outwardly radially protruding clamping wings each having a sloping clamping surface, and an associated side abutment surface. The screw member is in threaded engagement with the tool shank, with the clamping wings and locking wings aligned in pairs with the locking and clamping surfaces of each pair in abutment, and with each stop surface in abutment with a given side abutment surface.

13 Claims, 12 Drawing Sheets

ROTARY CUTTING TOOL

FIELD OF THE INVENTION

The present invention relates in general to rotary metal cutting tools, and specifically to reamers having replaceable cutting heads.

BACKGROUND OF THE INVENTION

A reamer of this type is disclosed in U.S. Pat. No. 4,040,765. In this design the reamer has an interchangeable cutter head with a conical butt which is inserted in a matching conical socket in the reamer shank. The cutter head is screwed to the reamer shank via a screw bolt. The conical engagement between the cutter head and the reamer shank ensures a connection free from play. However, this arrangement has the drawback that, particularly in the case of fairly strong feeding forces, the cutter head is pressed into the reamer shank and jams, especially because the conical engagement is also self-locking. The cutter head is hard to remove from the reamer shank, whereby the union pin in particular is subjected to great wear and tear. In this reamer there is no provision for equipping the cutter heads with coolant means. It is also not evident how coolant means could be incorporated in this reamer, especially not coolant means having exits adjacent the cutting edges. Furthermore, since the conical butt has an internal thread, the cutting head and conical butt cannot be made as a one piece integral member by form pressing and sintering a carbide powder.

Another example of such a reamer disclosed in U.S. Pat. No. 5,163,790. The reamer has an interchangeable cutter head and a coolant-lubricant feed supplying the cutter head from an annular nozzle disposed far from the cutting blades. The cutter-head shank is cylindrical and is retained in an opening of the reamer shank and is secured thereto by means of a clamping bolt passing through the cutter head. The clamping bolt includes a recessed hexagon by means of which the clamping bolt can be screwed in and out. To replace the cutter head the clamping bolt has to be disadvantageously completely removed from the reamer shank. In this reamer there is no provision leading coolant to the cutter head. Moreover, when replacing a cutter head and tightening the clamping bolt to secure the cutter-head in position, there is no guarantee that the clamping bolt will end up in the same rotationally oriented position each time. Therefore, even if the coolant were to be somehow supplied to the head of the bolt and radially directed coolant apertures were provided in the head of the bolt, it would not be certain that the apertures would aligned with the cutter-head cutting edges every time a cutter head was secured in position. Furthermore, if instead of cutter blades secured to the cutter head, it was desired to form a one piece integral cutter head and shank from solid carbide, the elongated form of the cutter head together with the cutter-head shank makes it very difficult to form press and sinter.

SUMMARY OF THE INVENTION

In accordance with the present invention, there is provided a rotary cutting tool having a forward end and a rearward end and a longitudinal axis A passing through the forward and rear ends, the cutting tool comprising a cutting head, a screw member and a tool shank;

the cutting head comprising a generally cylindrical main body portion and a rearwardly extending conical portion, and an axially directed through bore having a bore surface; a plurality of axially extending and inwardly radially protruding locking wings each with a sloping locking surface is formed on the bore surface; an axially extending stopper having a tangentially facing stop surface, protrudes from each locking wing;

the screw member comprises a plurality of axially extending and outwardly radially protruding clamping wings on a forward end thereof and an external screw thread rearward of the clamping wings, each clamping wing has a sloping clamping surface, and each clamping wing has an associated side abutment surface;

the tool shank has a receiving bore opening to a forward end thereof and comprising a conical forward portion and an internally threaded portion rearward of the conical portion; wherein, the external screw thread of the screw member is in threaded engagement with the internally threaded portion of the tool shank, the conical portion of the cutting head is located within the conical portion of the tool shank, the clamping wings and locking wings are aligned in pairs with the locking and clamping surfaces of each pair in abutment, and with each stop surface in abutment with a given side abutment surface.

In accordance with a first embodiment of the present invention, the stopper is located at a forward end of the locking wing.

Typically, the stopper protrudes from the locking surface.

Further in accordance with the first embodiment of the present invention, the given side abutment surface is at least a portion of a side surface of the clamping wing.

In accordance with a second embodiment of the present invention, the stopper is located at a rear end of the locking wing.

Further in accordance with the second embodiment of the present invention, the given side abutment surface is at least a portion of a side surface of a radial abutment member.

Preferably, the radial abutment member is located adjacent the external screw thread.

Further preferably, an axial abutment member is located between consecutive radial abutment members.

In accordance with the present invention, the tool shank has a channel communicating with a screw member bore, which screw member bore communicates with radially directed coolant outlets adjacent a forward end of the screw member, the coolant outlets being aligned with recesses in the cutting head, the recesses being adjacent cutting edges of the cutting head.

Further in accordance with the present invention, the screw member has resilient members extending from the external screw thread to a rearward end of the screw member.

In accordance with a specific application of the present invention, the rotary cutting tool is a reamer.

There is also provided in accordance with the present invention, a method of assembling the rotary cutting tool of the present invention, comprising:

positioning the screw member in the receiving bore until the external screw thread is in initial threaded engagement with the internally threaded portion;

placing the cutting head over the screw member with the locking wings passing between the clamping wings;

rotating the cutting head until the locking wings and the clamping wings are axially aligned in pairs and the stop surfaces abut the side abutment surfaces; and further rotating the cutting head until the locking and clamping surfaces of each pair of locking and clamping wings are in abutment and the screw member is fully screwed into the internally threaded portion thereby securing the cutting head to the tool shank.

BRIEF DESCRIPTION OF THE DRAWINGS

For a better understanding, the invention will now be described, by way of example only, with reference to the accompanying drawings in which.

DETAILED DESCRIPTION OF THE INVENTION

Figure 1:
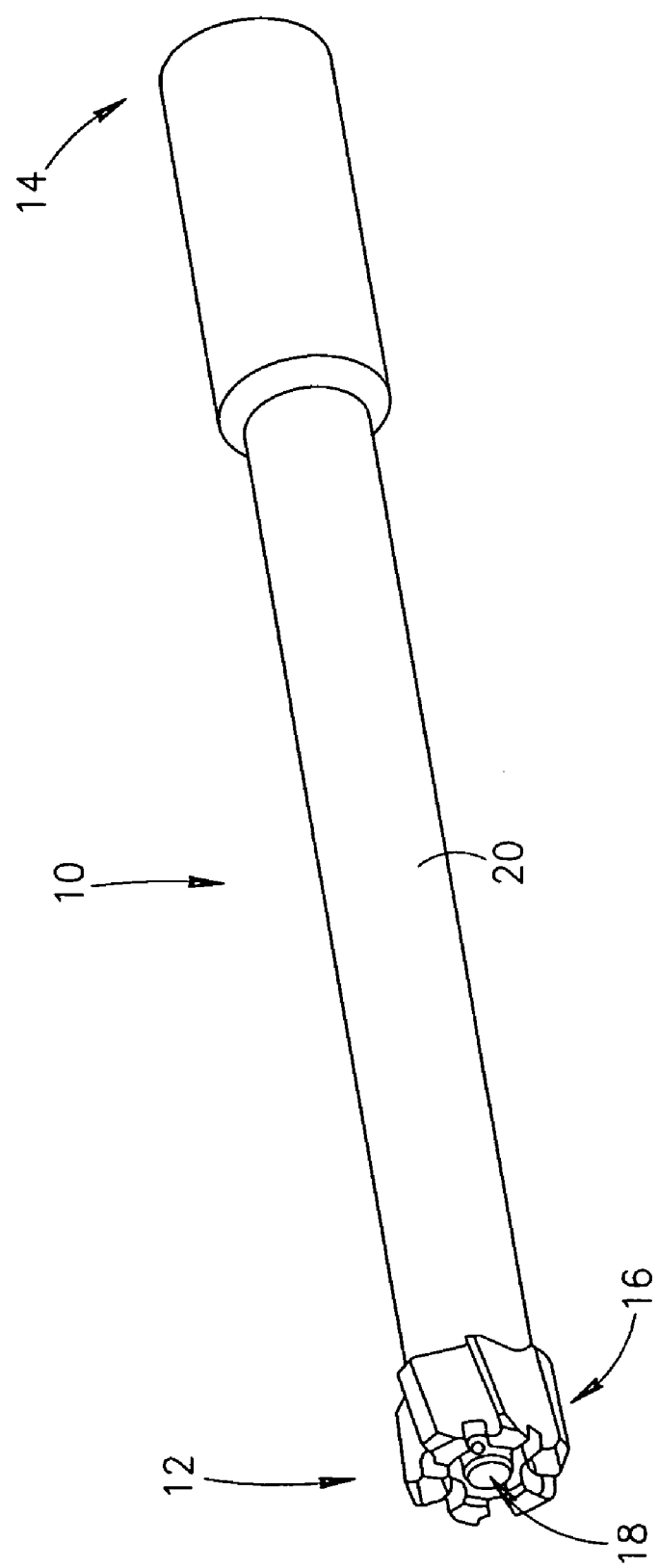
FIG. 1 is a perspective view of a rotary cutting tool in accordance with a first embodiment of the present invention.
Figure 2:
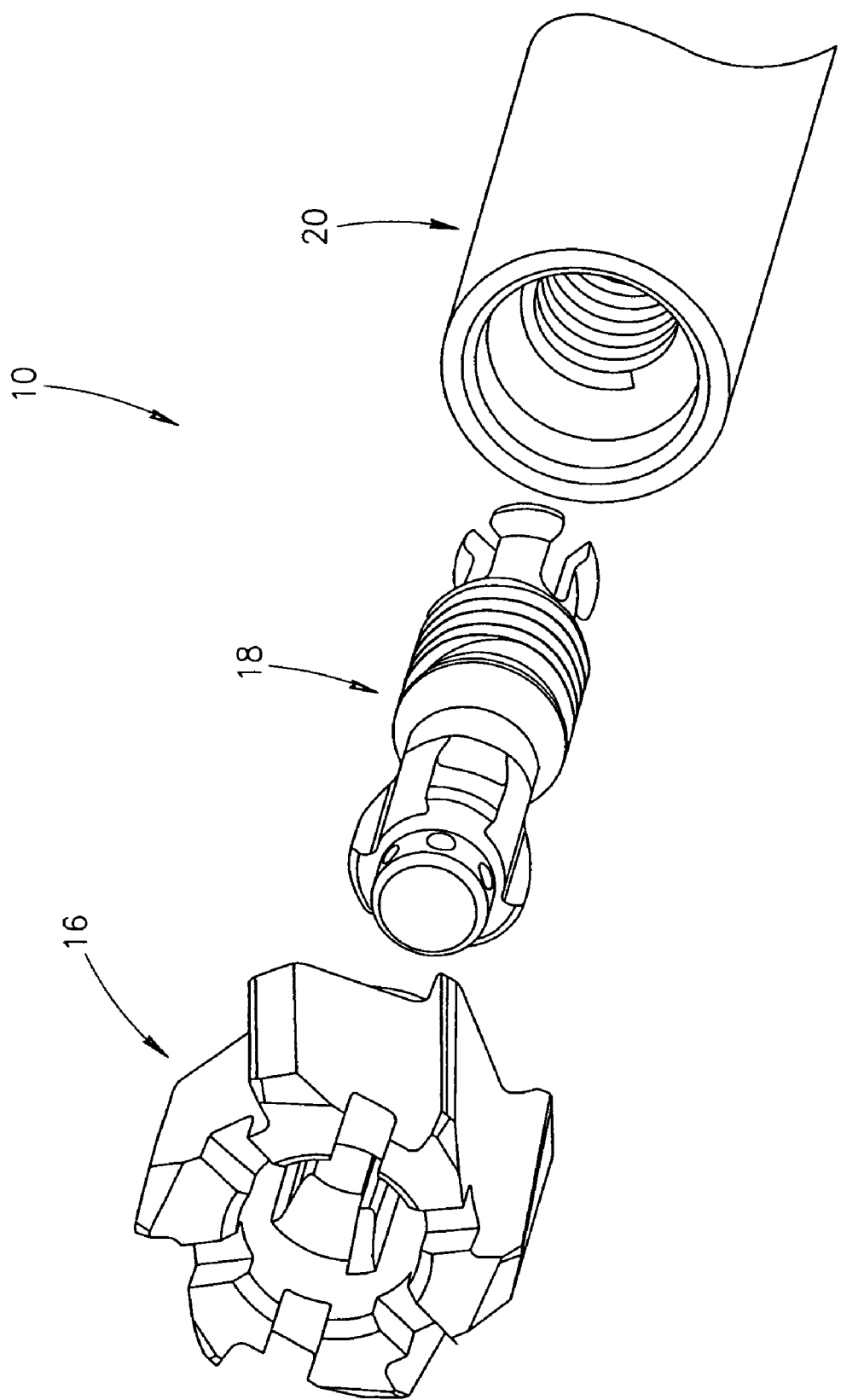
FIG. 2 is an exploded perspective of the rotary cutting tool in FIG. 1.
Figure 3:
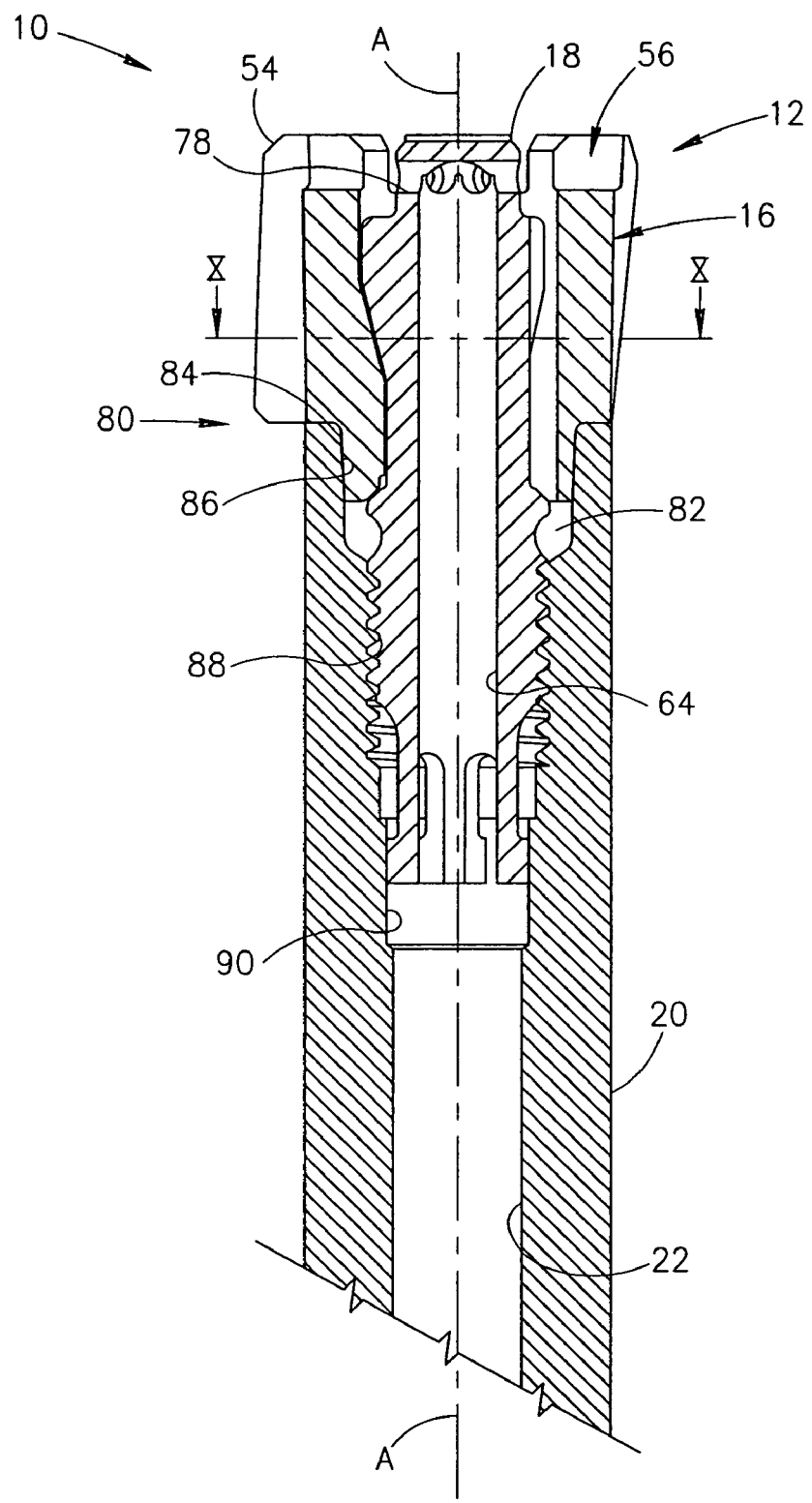
FIG. 3 is a longitudinal cross-sectional view of the rotary cutting tool in FIG. 1.

Attention is first drawn to FIGS. 1–3 showing a cutting tool in accordance with a first embodiment of the present invention illustrated by means of a reamer 10. The reamer 10 has a forward end 12, a rearward end 14 and a longitudinal axis of rotation A passing through the forward and rearward ends 12,14 defining a forward to rearward direction. The reamer 10 comprises a cutting head 16, a screw member 18, and a tool shank 20. The cutting head 16 preferably is a form pressed and sintered hard metal body made from a carbide powder such as Tungsten Carbide. The screw member 18 and the tool shank 20 are formed of machined steel or other hard materials. The tool shank 20 has an axially directed coolant channel 22 for providing coolant to the cutting head 16.

Figure 4:
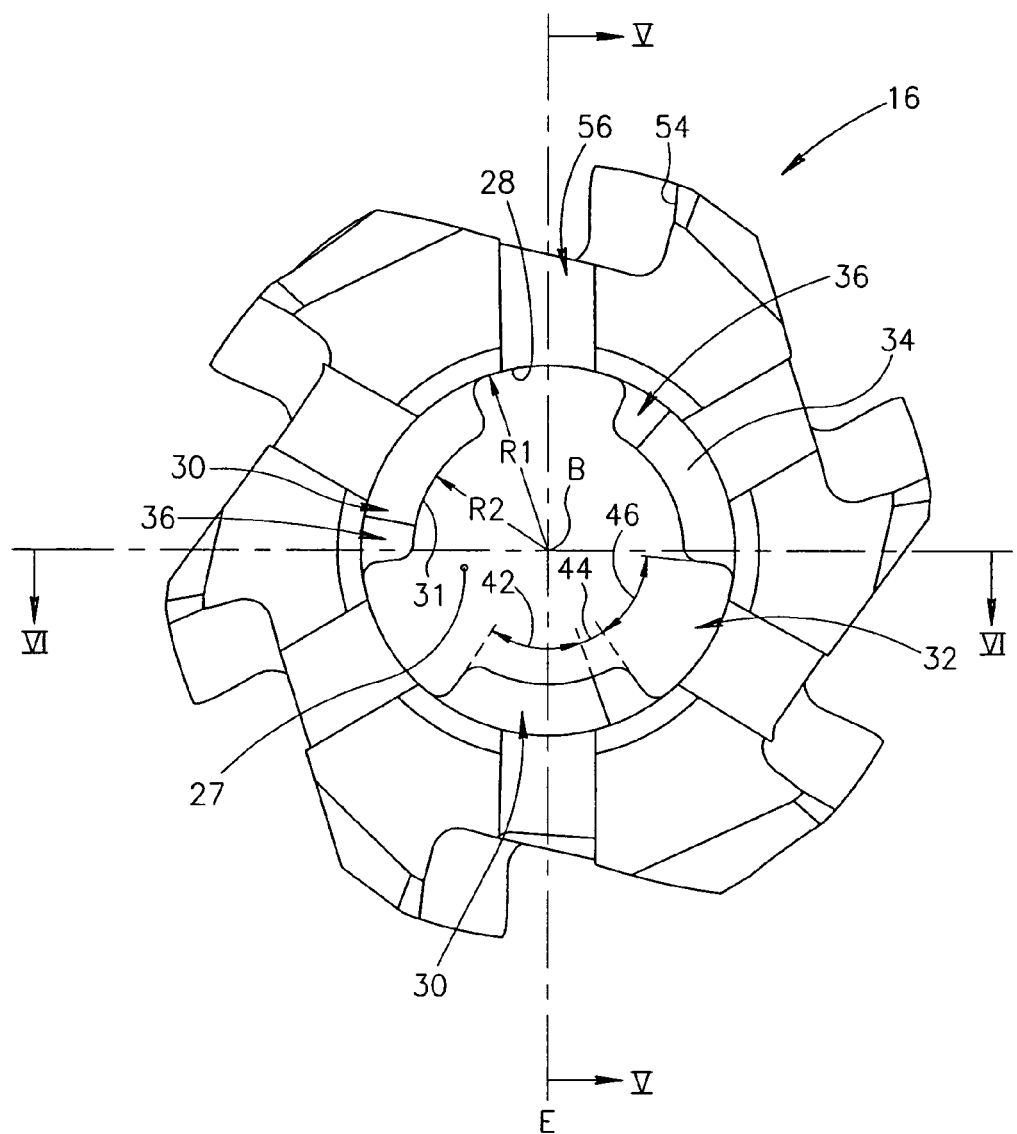
FIG. 4 is a top view of the cutting head of the rotary cutting tool shown in FIG. 1.
Figure 5:
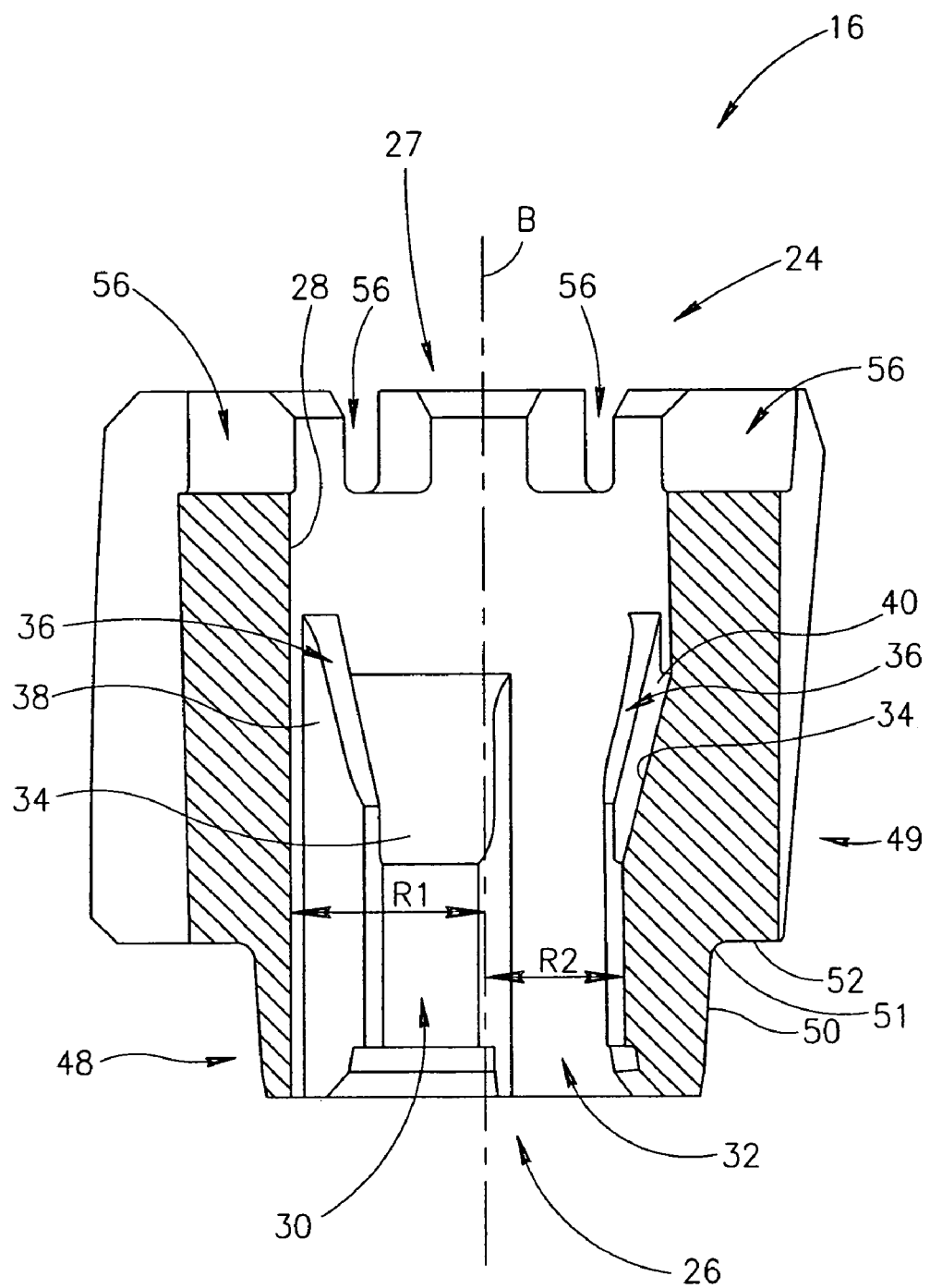
FIG. 5 is a cross-sectional view of the cutting head taken along the line V—V in FIG. 4.
Figure 6:
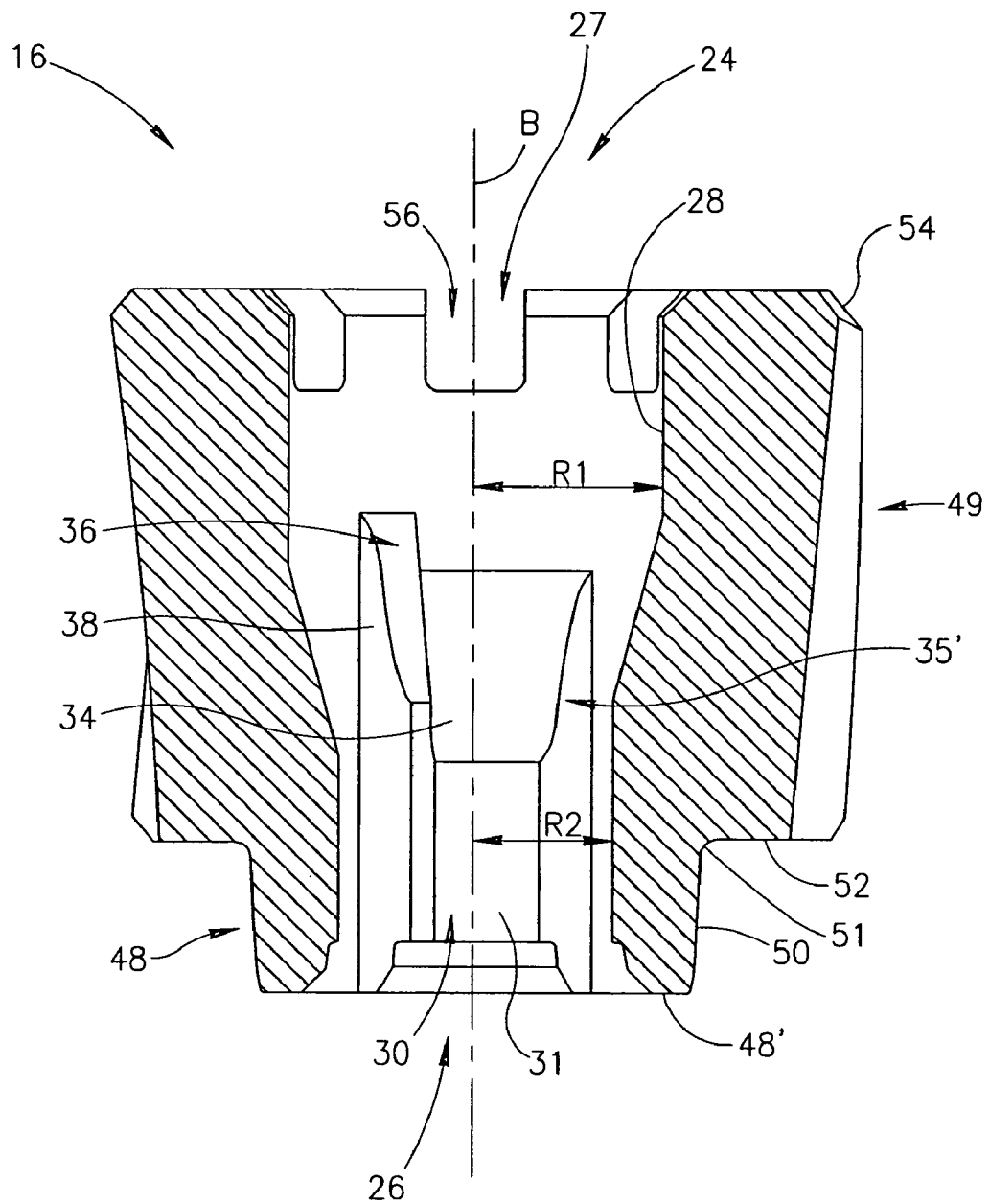
FIG. 6 is a cross-sectional view of the cutting head taken along the line VI—VI in FIG. 4.

The cutting head 16, shown in FIGS. 4–6, has a forward end 24, a rearward end 26, an axis of rotational symmetry B, and an axially directed cutting head bore 27 having a bore surface 28. When securing the cutting head 16 to the tool shank 20, the cutting head 16 is rotated clockwise around the axis B, when viewed in a top view. In the following, the terms "leading" and "trailing" will be used with respect to clockwise rotation of the cutting head 16. A bore radius R1 is defined between the axis of rotational symmetry B and the bore surface 28. The bore surface 28 has protruding from it, adjacent the rearward end 26 of the cutting head 16, three identical integrally formed radially inwardly projecting locking wings 30, each having a locking wing radial dimension R2 defined between an innermost surface 31 of the locking wings 30 and the axis of rotational symmetry B, wherein the locking wing radial dimension R2 is less than the bore radius R1. The locking wings 30 are equally spaced on the bore surface 28 about the axis of rotational symmetry B. Adjacent locking wings 30 are separated by locking wing gaps 32. Each locking wing 30 has a generally forwardly facing sloping locking surface 34. A stopper 36 protrudes from a forward end 35' of each locking wing 30, protruding in the axial direction from the locking surface 34, on a trailing side thereof. The stopper 36 has a generally radially extending, tangentially facing, first stop surface 38 on its trailing side and a generally radially extending, tangentially facing, second stop surface 40 on its leading side. The first and second stop surfaces 38, 40 are generally transverse to the locking surface 34 and preferably normal, or substantially normal, thereto. In a top view, the locking wing 30 has a first angular extent 42 defined by the locking surface 34. The stopper 36 has a second angular extents 44 that is smaller than the first angular extents 42. The first and second angular extent 42, 44 combine to form the total angular extent 45 of a single locking wing 30. The locking wing gap 32 has a third angular extent 46.

A conical portion 48 projects at the rearward end 26 of the cutting head 16 from a generally cylindrical main body portion 49 of the cutting head 16. The conical portion 48 has an outer conical surface 50 coaxially aligned with the axis of rotational symmetry B and tapering rearwardly to a rearwardly facing annular contact surface 48'. The outer conical surface 50 merges with the cutting head 16 via a step 51 formed by the outer conical surface 50 and a rearwardly facing planar annular abutment surface 52 of the main body portion 49 of the cutting head 16.

The cutting head 16 has a crown-like structure at its forward end 24 having six identical equally spaced cutting edges 54 and recesses 56, each recess 56 being substantially adjacent an associated cutting edge 54. A key (not shown) having protrusions that match the recesses 56, mates with the forward end 24 of the cutting head 16 in order to rotate the cutting head 16 during assembly, or disassembly of the reamer 10.

Figure 7:
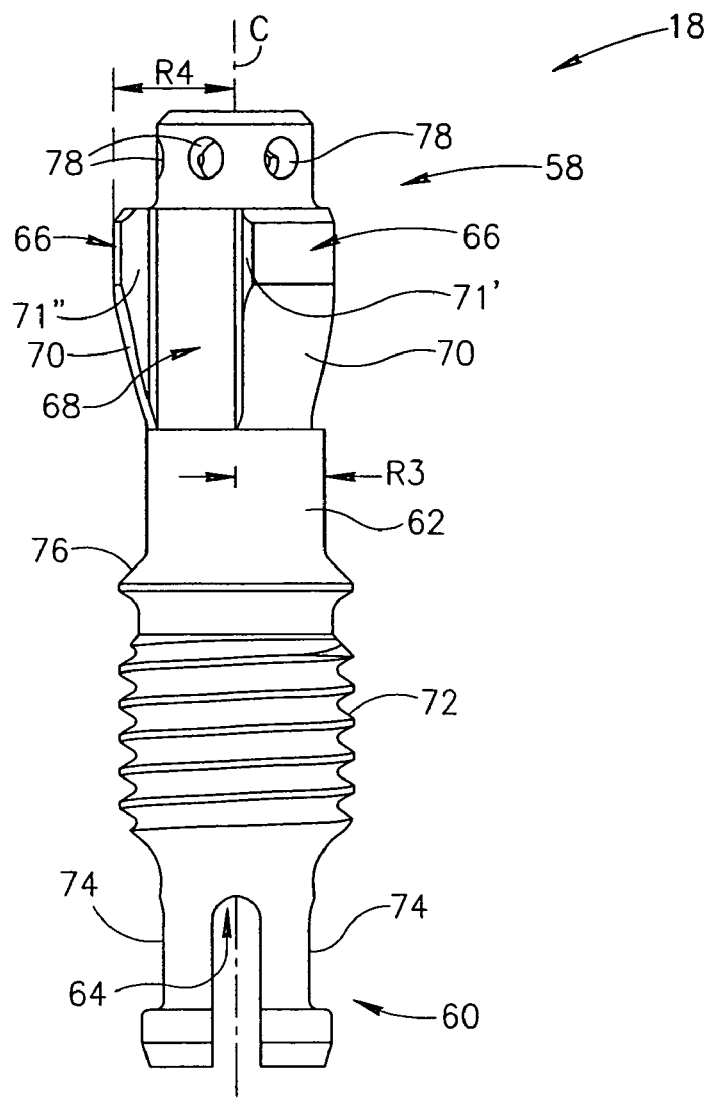
FIG. 7 is a side view of the screw member in FIG.2.
Figure 8:
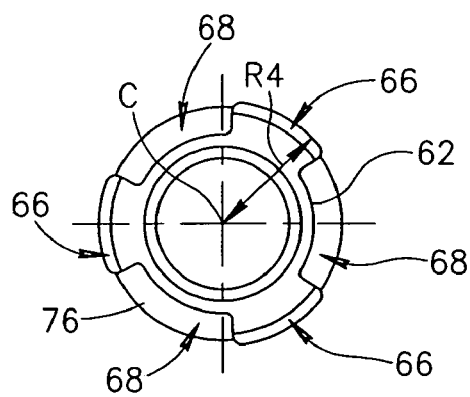
FIG. 8 is a top view of the screw member in FIG.2.

Attention is now drawn to FIGS. 7 and 8, showing the screw member 18. The screw member 18 has a forward end 58, a rearward end 60, a longitudinal axis C, and a generally tube-like body having a peripheral surface 62 and an axially directed screw member bore 64 open at the rearward end 60. The peripheral surface 62 has a peripheral radial dimension R3 defined between the longitudinal axis C and the peripheral surface 62, wherein the peripheral radial dimension R3 is less than the locking wing radial dimension R2. The screw member 18 has three identical clamping wings 66 located towards its forward end 58. The clamping wings 66 protrude radially outwardly from the peripheral surface 62 at a maximum clamping wing radial dimension R4 with respect to the longitudinal axis C, wherein the maximum clamping wing radial dimension R4 is greater than the locking wing radial dimension R2, but less than the bore radius R1. The clamping wings 66 are equally spaced apart about the longitudinal axis C, with adjacent clamping wings 66 separated by clamping wing gaps 68. Each clamping wing gap 68 is substantially equal in angular extent to the total angular extent 45 of each locking wing 30. Each clamping wing 66 has an angular extent with respect to the longitudinal axis C substantially less than the angular extent of each locking wing gap 32. Each clamping wing 66 has a sloping slightly convex, outwardly and rearwardly facing clamping surface 70 and first and second opposing generally radially extending side abutment surfaces 71', 71".

The screw member 18 is has an external screw thread 72 towards its rearward end 60 and four resilient members 74, extending from the external screw thread 72 to the rearward end 60. The resilient members 74 give the rearward end 60 a degree of flexibility in the radial direction. An abutment ring 76 projects radially outwardly from the screw member 18 at a location between the clamping wings 66 and the external screw thread 72, preferably adjacent thereto. At the forward end of the screw member 18 are six radially directed coolant outlets 78 communicating between the screw member bore 64 and the peripheral surface 62.

Figure 9:
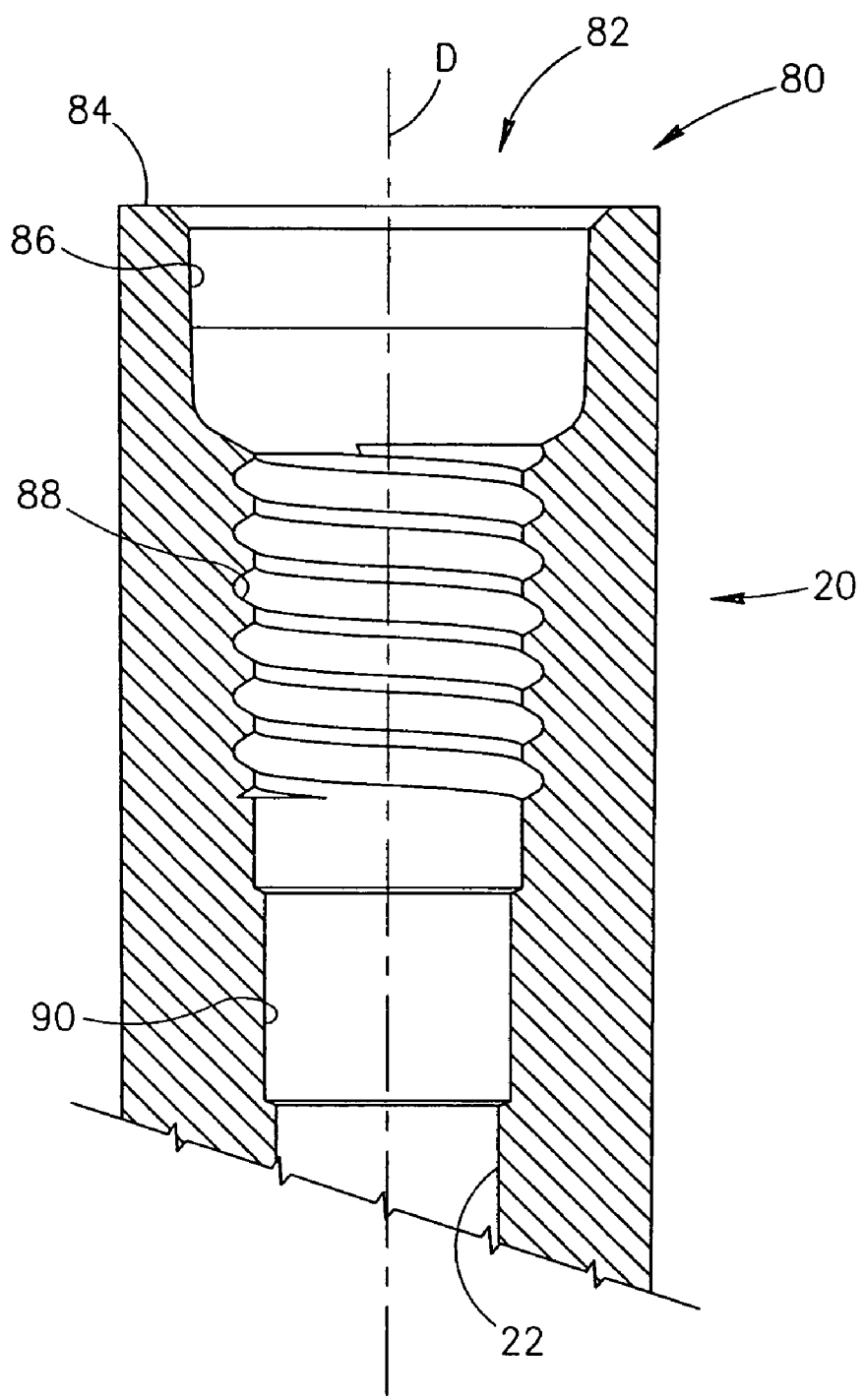
FIG. 9 is a longitudinal cross-sectional view of the tool shank in FIG. 1.

Attention is now drawn to FIG. 9, showing the forward end 80 of the tool shank 20, which is has a receiving bore 82, a planar forwardly facing annular support surface 84, a longitudinal axis D, and the coolant channel 22 extending rearwardly from the receiving bore 82. The receiving bore 82 and the coolant channel 22 are coaxially aligned with the longitudinal axis D. The receiving bore 82 has a rearwardly tapering conical forward portion 86, and an internally threaded portion 88 extends from the conical forward portion 86 to a resisting portion 90. The resisting portion 90 has a diameter slightly smaller than the diameter of the rearward end 60 of the screw member 18.

Figure 10:
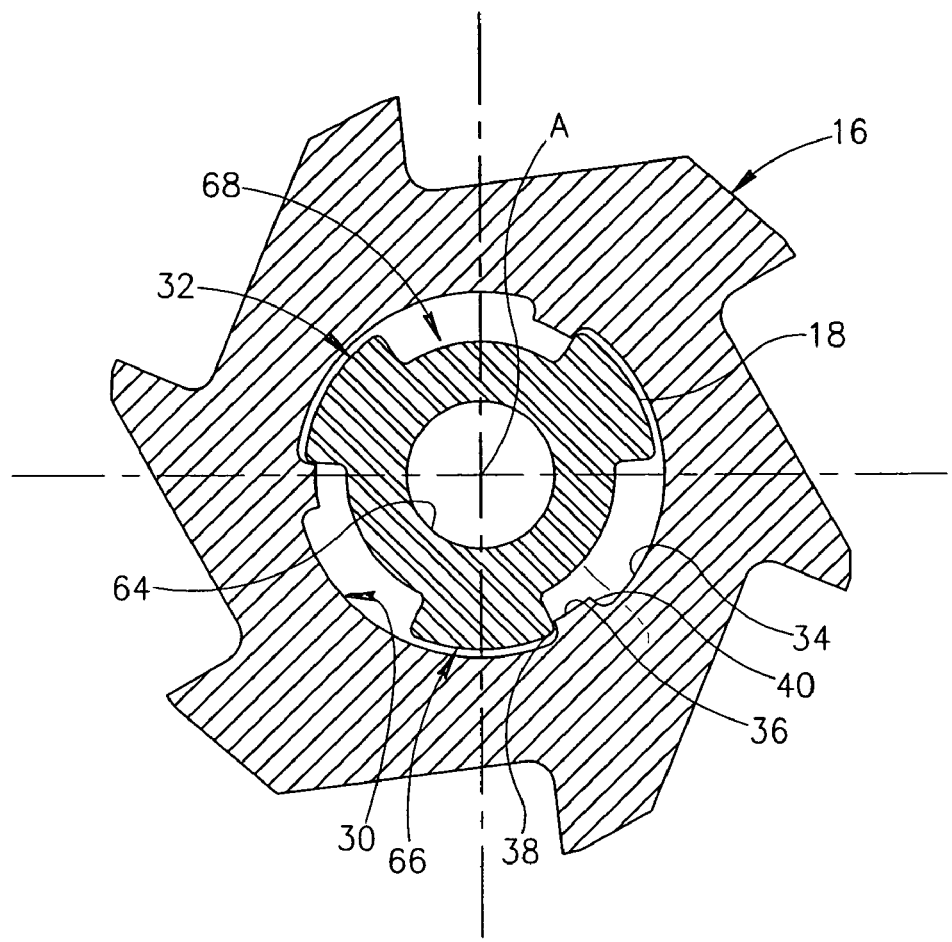
FIG. 10 is a cross-section of the cutting head and screw member taken along the line X—X in FIG. 3 with the cutting head in an open position.
Figure 11:
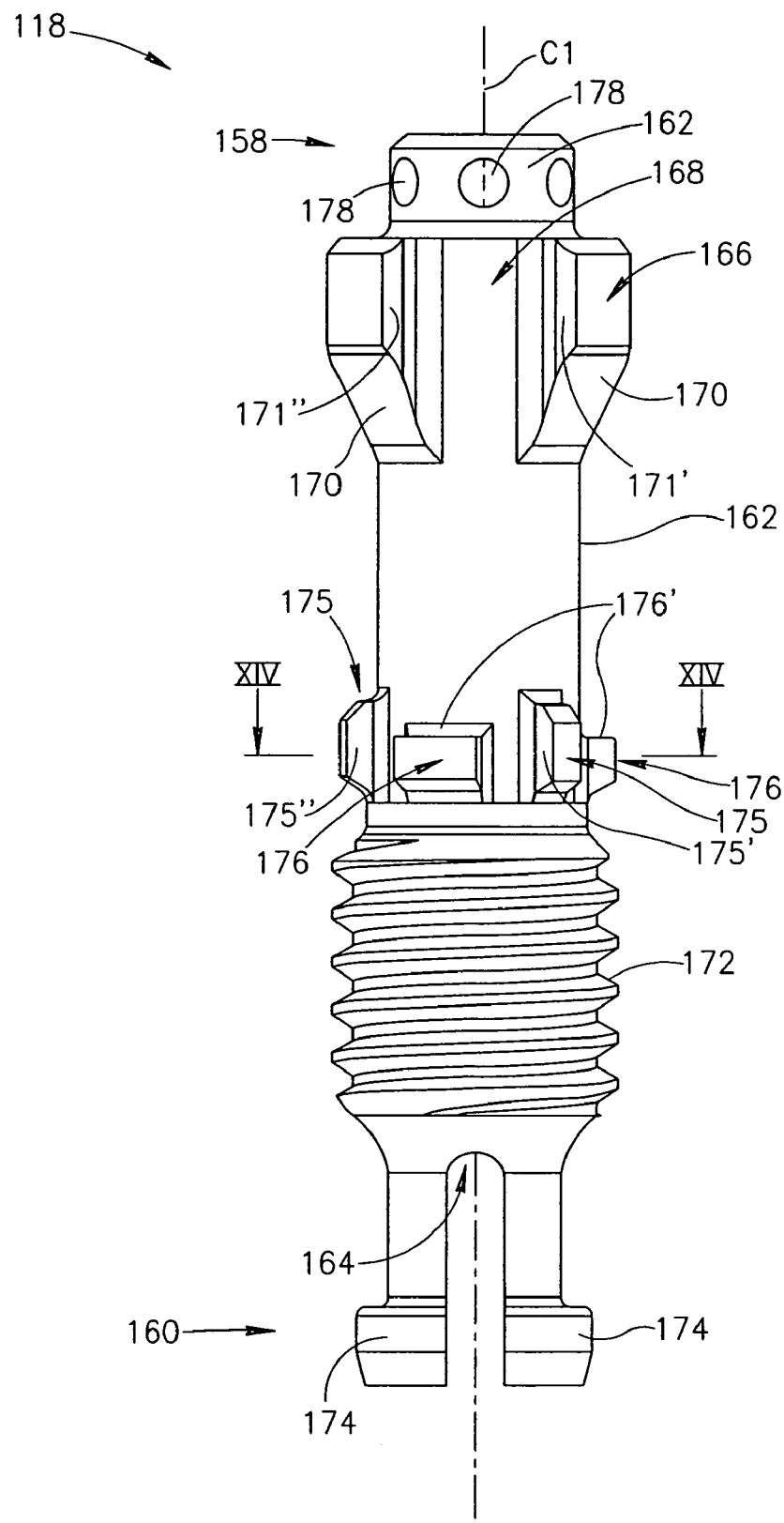
FIG. 11 is a side view of a screw member of a rotary cutting tool in accordance with a second embodiment of the present invention.
Figure 12:
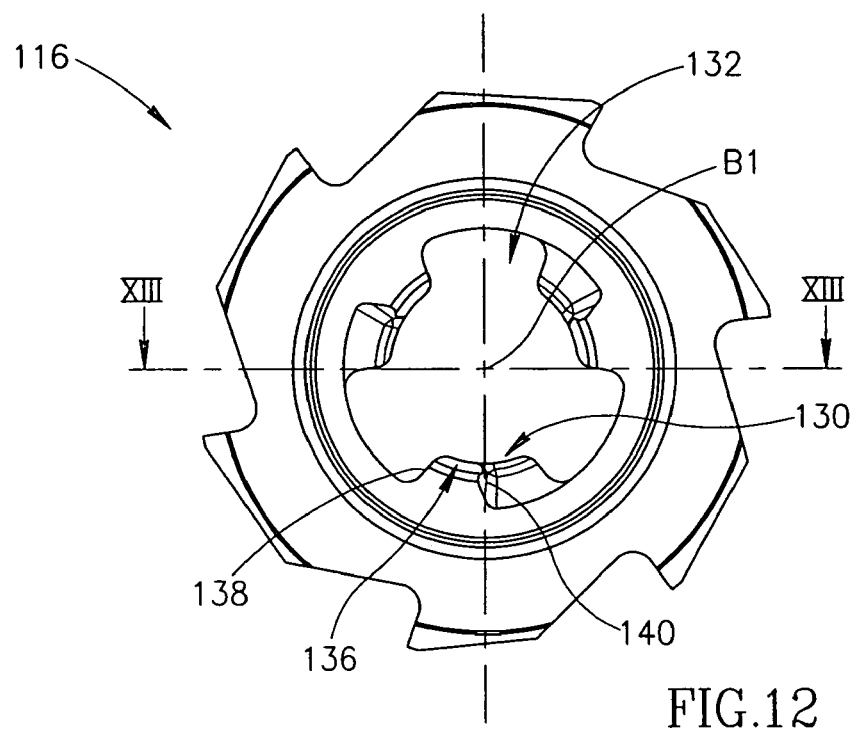
FIG. 12 is a bottom view of a cutting head of the rotary cutting tool in accordance with the second embodiment of the present invention.
Figure 13:
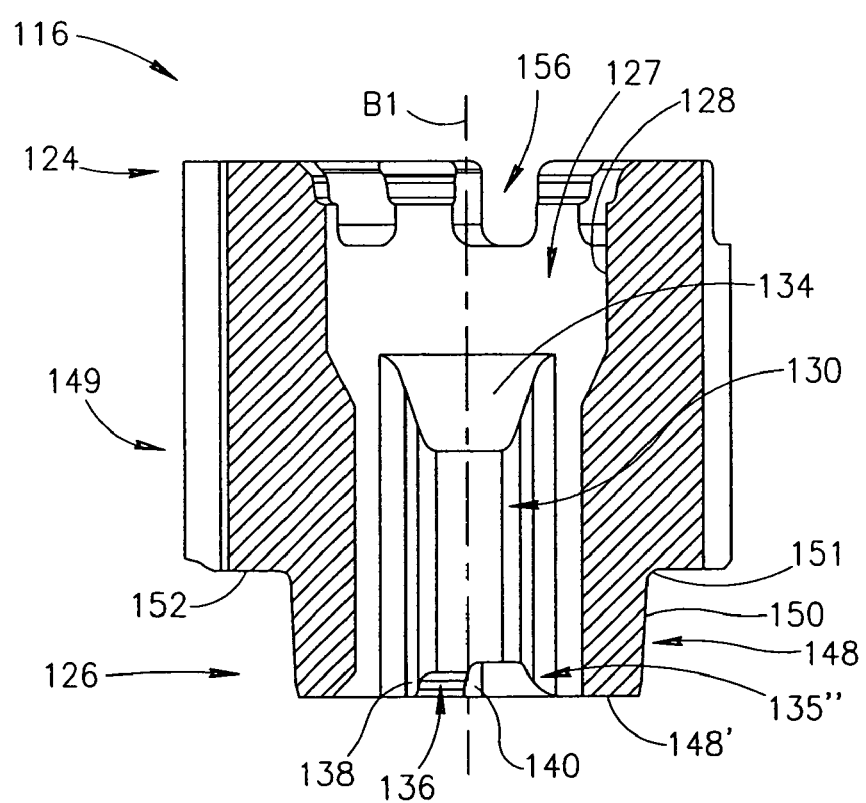
FIG. 13 is a cross sectional view of the cutting head of the rotary cutting tool in accordance with the second embodiment of the present invention, taken along the line XIII—XIII in FIG. 12.
Figure 14:
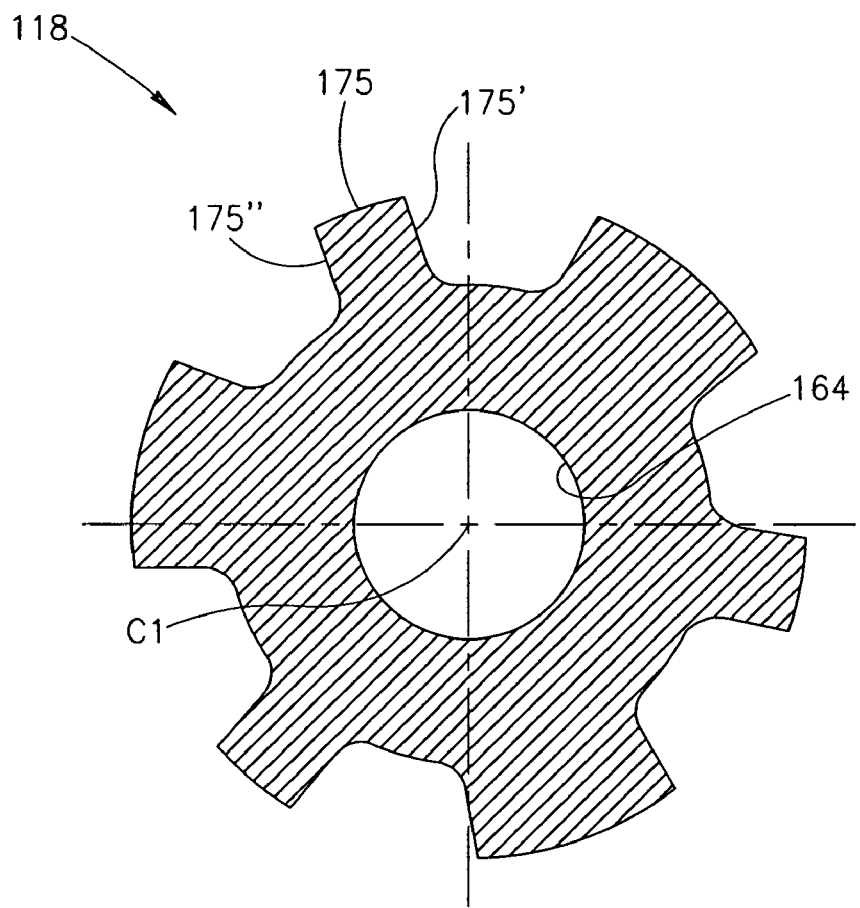
FIG. 14 is a cross sectional view of the screw member in FIG. 1, taken along the line XIV—XIV.

The assembly of the reamer 10 is performed by placing the rearward end 60 of the screw member 18 within the receiving bore 82 of the tool shank 20 and bringing the external screw thread 72 into initial threading engagement with the internally threaded portion 88. The cutting head 16 is placed upon the screw member 18 with the rearward end 26 of the cutting head 16 over the forward end 58 of the screw member 18, until the annular contact surface 48' of the conical portion 48 of the cutting head 16 abuts the abutment ring 76. In this position, the cutting head 16 will be referred to as being in an open-position, as shown in FIG. 10. In the open-position, the clamping wings 66 lie in the locking wing gaps 32 of the cutting head 16 and the locking wings 30 lie in the clamping wing gaps 68 of the screw member 18.

In order to secure the cutting head 16 to the tool shank 20, the cutting head 16 is now rotated in a clockwise direction about the axis of rotational symmetry B, when the cutting head 16 is viewed in the top view. The resilient members 74 engage the resisting portion 90 restraining the screw member 18 from freely rotating. The cutting head 16 is rotated from the open position, until each locking wing 30 slides underneath a corresponding clamping wing 66 with the locking and clamping surfaces 34, 70 in abutment, and each second stop surface 40 of the stoppers 36 abuts a corresponding clamping wing 66 at the second side abutment surface 71" thereof. As the cutting head 16 is further rotated, the screw member 18 rotates with it due to the engagement of the second stop surface 40 and the second side abutment surface 71" of the clamping wing 66, thereby securing the screw member 18 in the threaded portion 88. With abutment between the clamping surface 70 and the locking surface 34 being maintained, the screw member 18 pulls the conical portion 48 of the cutting head 16 into the conical forward portion 86 of the tool shank 20 until the annular abutment surface 52 of the cutting head 16 is brought into engagement with the annular support surface 84 of the tool shank 20. With the conical portion 48 of the cutting head 16 located in the conical forward portion 86 of the tool shank 20, the cutting head 16 is centered with respect to the tool shank 20.

It should be noted that the cutting head 16 does not have a threaded portion. Instead, the threading is located on the screw member 18, thereby effectively decoupling any adverse effects that the threading can have on the centering of the cutting head 16. As mentioned above, the clamping surface 70 of each clamping wing 66 is slightly convex, thereby ensuring that the screw member 18 "floats" as the cutting head 16 is rotated clockwise in order to securely clamp the cutting head 16 in position. Surface contact by the clamping wings 66 and the locking wings 30 is designed not to affect the centering of the cutting head 16 formed by location of the conical portion 48 of the cutting head 16 in the conical forward portion 86 of the tool shank 20. The coolant outlets 78 are spatially distributed with respect to the clamping wings 66 in such a manner that when the reamer 10 is assembled, the recesses 56 are aligned with the coolant outlets 78, thus ensuring that the coolant is supplied directly to each of the cutting edges 54. The alignment of the coolant outlets 78 with the recesses 56 is made possible due to the fact that the second stop surface 40 of each stopper 36 abuts a corresponding second side abutment surface 71" of each clamping wing 66.

To unclamp the cutting head 16 and remove it from the tool shank 20, the cutting head 16 is rotated in an anticlockwise direction. Initially, the cutting head 16 will rotate until the first stop surfaces 38 abut the first side abutment surfaces 71" of the clamping wings 66, thereby unscrewing the screw member 18. As the screw member 18 exits the receiving bore 82, the abutment ring 76 pushes up on the conical portion 48 of the cutting head 16 forcing it out of the conical forward portion 86 of the receiving bore 82. At this stage, the cutting head 16 can be lifted off of the screw member 18 and a new cutting head 16 can be placed in position on the screw member 18. Hence, in normal operation, the screw member 18 does not have to be removed; it is simply screwed in and out of the receiving bore 82 by a few turns every time a cutting head 16 is replaced. If it is required to remove the screw member 18, that is, to disassemble the reamer 10, then one simply continues to rotate the cutting head 16 in an anticlockwise direction until the screw member 18 is completely unscrewed.

As described above, in accordance with the first embodiment of the present invention, rotational coupling between the cutting head and the screw member is obtained by the engagement of the clamping wings 66 of the screw member 18 and the stoppers 36 which protrude forwardly in the axial direction from the locking surfaces 34 of the locking wings 30. When the cutting head 16 is attached to the tool shank 20, each locking wing 30 is located underneath a corresponding clamping wing 66 with the locking and clamping surfaces 34, 70 in abutment.

Attention is now drawn to FIGS. 11 to 14 showing a cutting head 116, a screw member 118 and the tool shank 20 of a reamer 110 in accordance with a second embodiment of the present invention. The reamer 110 according to the second embodiment is not shown, but is identical in appearance to the reamer 10 in accordance with the first embodiment, as shown in FIG. 1. The tool shank 20 of the reamer 110 according to the second embodiment is identical to the tool shank 20 of the first embodiment. The assembly and disassembly of the reamer 110 in accordance with the second embodiment and the securing of the cutting head 116 to, and removal from, the tool shank 20, is procedurally the same as in the first embodiment. Therefore, the description of the reamer 110 in accordance with the second embodiment will focus principally on the differing features between the two embodiments.

The cutting head 116 has a forward end 124, a rearward end 126, an axis of rotational symmetry B1, and an axially directed cutting head bore 127 having a bore surface 128. The bore surface 128 has protruding from it, adjacent the rearward end 126 of the cutting head 116, three identical integrally formed radially inwardly projecting locking wings 130. The locking wings 130 are equally spaced about the axis of rotational symmetry B1 on the bore surface 128 and have locking wing gaps 132 between adjacent locking wings 130. Each locking wing 130 has a generally forwardly facing sloping locking surface 134 and a stopper 136 located at the rear end 135" of the locking wing 130. The stopper 136 protrudes in the axial direction from the rear end 135", on a trailing side thereof. The stopper 136 has a radially extending, generally tangentially facing, first stop surface 138 on its trailing side and a radially extending, generally tangentially facing, second stop surface 140 on its leading side.

A conical portion 148 projects at the rearward end 126 of the cutting head 116 from a generally cylindrical main body portion 149 of the cutting head 116. The conical portion 148 has an outer conical surface 150 coaxially aligned with the axis of rotational symmetry B1 that tapers rearwardly to a rearwardly facing annular contact surface 148'. The outer conical surface 150 merges with the cutting head 116 at a step 151 formed by the outer conical surface 150 and a rearwardly facing planar annular abutment surface 152 of the cylindrical main body portion 149 of the cutting head 116. The external appearance of the cutting head 116 in accordance with the second embodiment is identical to that of the first embodiment. The cutting head 116 having a crown-like structure at its forward end 124 having six identical equally spaced cutting edges 154 (not seen in FIGS. 12 and 13) and recesses 156, each recess 156 being substantially adjacent an associated cutting edge 154.

The screw member 118 has a forward end 158, a rearward end 160, a longitudinal axis C1, and a generally tube-like body having a peripheral surface 162 and an axially directed screw member bore 164 open at its rearward end 160. The screw member 118 has three identical clamping wings 166 located towards its forward end 158. The clamping wings 166 protrude radially outwardly from the peripheral surface 162 and are equally spaced apart about the longitudinal axis Cl, having clamping wing gaps 168 between them. Each clamping wing 166 has a sloping, preferably slightly convex, outwardly and rearwardly facing clamping surface 170 and first and second generally radially extending side surfaces 171', 171".

The screw member 118 has an external screw thread 172 located towards its rearward end 160 and four resilient members 174, extending from the external screw thread 172 to the rearward end 160 thereby providing the rearward end 160 a degree of flexibility in the radial direction. Radial abutment members 175, protruding radially outwardly from the peripheral surface 162, are located between the external screw thread 172 and the clamping wings 166 adjacent the external screw thread 172. The radial abutment members 175 are spaced equally around the peripheral surface 162 with an axial abutment member 176 located between each radial abutment member 175. Each radial abutment member 175 has first and second side abutment surfaces 175', 175". Each axial abutment member 176 has an axially and forwardly facing axial abutment surface 176'. The screw member 118 has six radially directed coolant outlets 178 adjacent the forward end 158, communicating between the screw member bore 164 and the peripheral surface 162. As with the first embodiment, in the second embodiment the coolant outlets 178 are spatially distributed with respect to the clamping wings 166 in such a manner that when the reamer 110 is assembled, the recesses 156 are aligned with the coolant outlets 178, thus ensuring that the coolant is supplied directly to each of the cutting edges 154.

The reamer 110, in accordance with the second embodiment of the present invention, is assembled much in the same way as the reamer 10 in accordance with the first embodiment. The rearward end 160 of the screw member 118 is placed in coaxial alignment within the receiving bore 82 of the tool shank 20, so that the external screw thread 172 is in initial threading engagement with the internally threaded portion 88 of the tool shank 20. The cutting head 116 is placed upon the screw member 118 with the rearward end 126 of the cutting head 16 over the forward end 158 of the screw member 118, and the rearwardly facing annular contact surface 148' of the conical portion 148 is in abutment with the forwardly facing axial abutment surfaces 176' of the axial abutment members 176. In this position, referred to the "open-position", the clamping wings 166 lie in the locking wing gaps 132 of the cutting head 116 and the locking wings 130 lie in the clamping wing gaps 168 of the screw member 118.

In order to secure the cutting head 116 to the tool shank 20, the cutting head 116 is now rotated in a clockwise direction about the axis of rotational symmetry B, when the cutting head 116 is viewed in a top view. The cutting head 116 is rotated from the open position, until each locking wing 130 slides underneath an opposing clamping wing 166 so that the locking wings 130 and clamping wings 166 form opposing wing pairs. In each wing pair, the clamping surface 170 of the clamping wing 166 is in abutment with the locking surface 134 of the locking wing 130. In this position, the stoppers 136 and the radial abutment members 175 form radial abutment pairs. In each radial abutment pair, the second stop surface 140 of the stopper 136 is in abutment with the second side abutment surface 175" of the radial abutment member 175. The cutting head 116 is rotated until the screw member 118 is completely screwed into in the threaded portion 88 and the conical portion 148 of the cutting head 116 is located in a conical forward portion 86 of the tool shank 20 with the annular abutment surface 152 of the cutting head 116 in engagement with an annular support surface 84 at a forward end of the tool shank 20.

To unclamp the cutting head 116 and remove it from the tool shank 20, the cutting head 116 is rotated in an anti-clockwise direction. Initially, the cutting head 116 will rotate until the first stop surfaces 138 abut the first side abutment surfaces 175' of the radial abutment members 175, thereby unscrewing the screw member 118. As the screw member 118 exits the receiving bore 82, the forwardly facing axial abutment surfaces 176' of the axial abutment members 176 push up on the annular contact surface 148' of the conical portion 148 of the cutting head 116 forcing it out of the receiving bore 82.

Although the present invention has been described to a certain degree of particularity, it should be understood that various alterations and modifications could be made without departing from the spirit or scope of the invention as hereinafter claimed.

What is claimed is:

1. A rotary cutting tool having a forward end and a rearward end and a longitudinal axis A passing through the forward and rear ends, the cutting tool comprising a cutting head, a screw member and a tool shank;

the cutting head comprising a generally cylindrical main body portion and a rearwardly extending conical portion, and an axially directed through bore having a bore surface; a plurality of axially extending and inwardly radially protruding locking wings each having a sloping locking surface protruding from the bore surface; an axially extending stopper having a tangentially facing stop surface, protruding from each locking wing;

the screw member comprises a plurality of axially extending and outwardly radially protruding clamping wings on a forward end thereof and an external screw thread rearward of the clamping wings, each clamping wing having a sloping clamping surface, and each clamping wing having an associated side abutment surface;

the tool shank having a receiving bore opening to a forward end thereof and comprising a conical forward portion and an internally threaded portion rearward of the conical portion;

wherein, the external screw thread of the screw member is in threaded engagement with the internally threaded portion of the tool shank, the conical portion of the cutting head is located within the conical portion of the tool shank, the clamping wings and locking wings are aligned in pairs with the locking and clamping surfaces of each pair in abutment, and with each stop surface in abutment with a given side abutment surface.

2. The rotary cutting tool according to claim 1, wherein the stopper is located at a forward end of the locking wing.

3. The rotary cutting tool according to claim 2, wherein the stopper protrudes from the locking surface.

4. The rotary cutting tool according to claim 3, wherein the given side abutment surface is at least a portion of a side surface of the clamping wing.

5. The rotary cutting tool according to claim 1, wherein the stopper is located at a rear end of the locking wing.

6. The rotary cutting tool according to claim 5, wherein the given side abutment surface is at least a portion of a side surface of a radial abutment member.

7. The rotary cutting tool according to claim 6, wherein the radial abutment member is located adjacent the external screw thread.

8. The rotary cutting tool according to claim 5, wherein an axial abutment member is located between consecutive radial abutment members.

9. The rotary cutting tool according to claim 1, wherein the tool shank has a channel communicating with a screw member bore, which screw member bore communicates with radially directed coolant outlets adjacent a forward end of the screw member, the coolant outlets being aligned with recesses in the cutting head, the recesses being adjacent cutting edges of the cutting head.

10. The rotary cutting tool according to claim 1, wherein the screw member has resilient members extending from the external screw thread to a rearward end of the screw member.

11. The rotary cutting tool according to claim 10, wherein the rotary cutting tool is a reamer.

12. A method of assembling the rotary cutting tool of claim 1, comprising:

positioning the screw member in the receiving bore until the external screw thread is in initial threaded engagement with the internally threaded portion;

placing the cutting head over the screw member with the locking wings passing between the clamping wings;

rotating the cutting head until the locking wings and the clamping wings are axially aligned in pairs and the stop surfaces abut the side abutment surfaces; and further rotating the cutting head until the locking and clamping surfaces of each pair of locking and clamping wings are in abutment and the screw member is fully screwed into the internally threaded portion thereby securing the cutting head to the tool shank.

13. A rotary cutting tool assembly comprising a cutting head, a screw member and a tool shank, wherein:

the cutting head has a forward end and a rearward end, and comprises a generally cylindrical main body portion, a rearwardly extending conical portion, an axially directed through bore having a bore surface; a plurality of axially extending and inwardly radially protruding locking wings each having a sloping locking surface protruding from the bore surface; and an axially extending stopper having a tangentially facing stop surface, protruding from each locking wing;

the screw member has a forward end and a rearward end, and comprises a plurality of axially extending and outwardly radially protruding clamping wings and an external screw thread rearward of the clamping wings, each clamping wing having a sloping clamping surface, and each clamping wing having an associated side abutment surface;

the tool shank having a receiving bore opening to a forward end thereof and comprising a conical forward portion and an internally threaded portion rearward of the conical portion; and the rotary cutting tool assembly is adjustable between a disassembled position in which the cutting head, screw member and tool shank are unconnected to one another and an assembled position in which the external screw thread of the screw member is in threaded engagement with the internally threaded portion of the tool shank, the conical portion of the cutting head is located within the conical portion of the tool shank, the clamping wings and locking wings are aligned in pairs with the locking and clamping surfaces of each pair in abutment, and with each stop surface in abutment with a given side abutment surface.

* * * * *